July 24, 1951 A. P. MONTGOMERY 2,561,586

DEFLECTION CIRCUIT FOR CATHODE-RAY TUBES

Filed Feb. 11, 1948

INVENTOR.
ANDREW PEERS MONTGOMERY
BY
Brown, Denk & Synnestvedt
AGENTS

Patented July 24, 1951

2,561,586

UNITED STATES PATENT OFFICE 2,561,586

DEFLECTION CIRCUIT FOR CATHODE-RAY TUBES

Andrew Peers Montgomery, Philadelphia, Pa., assignor to Philco Corporation, Philadelphia, Pa., a corporation of Pennsylvania Application February 11, 1948, Serial No. 7,560

5 Claims. (Cl. 315—27)

Figures 1, 2:
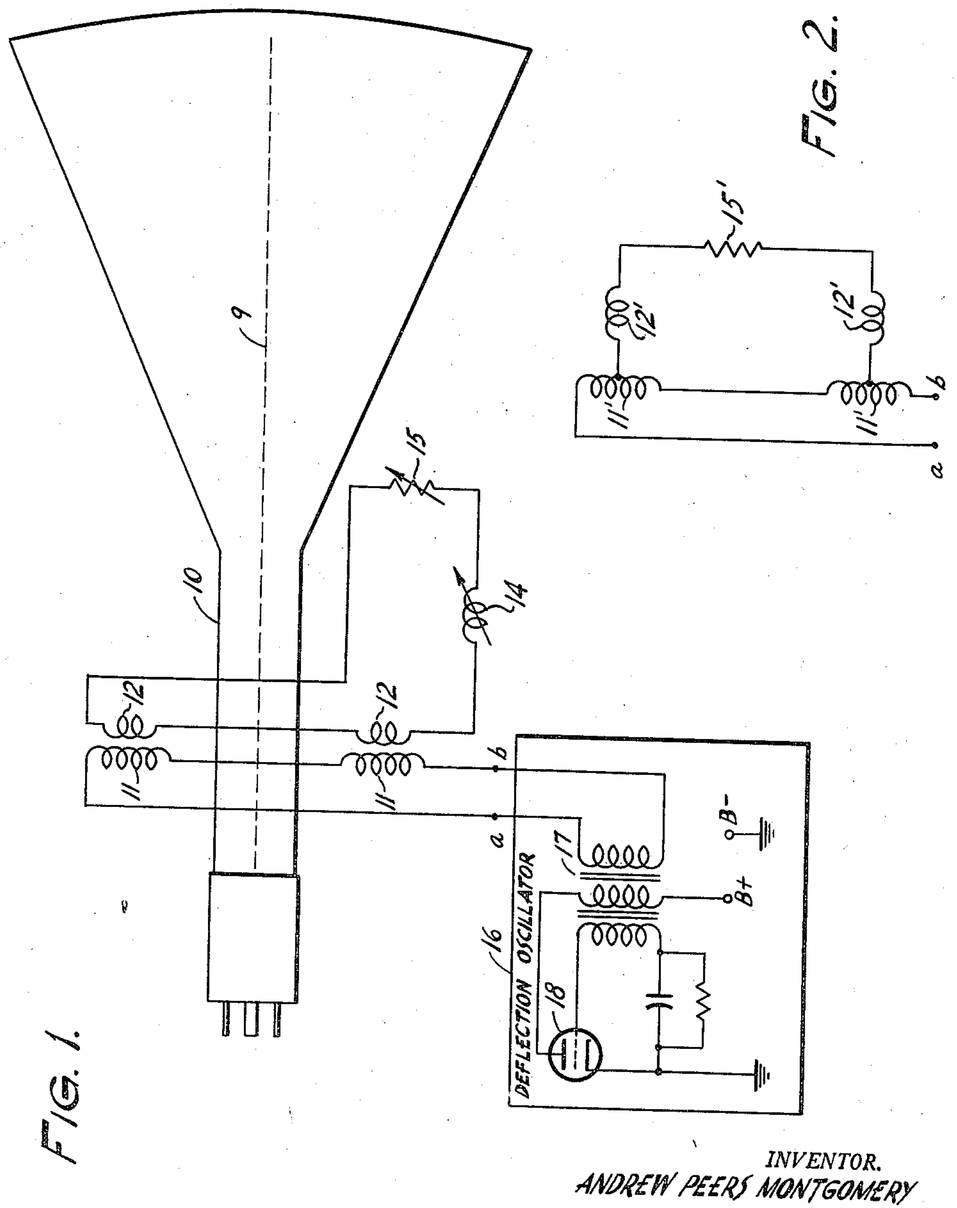

The invention herein described and claimed relates to improved means for correcting, or modifying in desired manner, the flux established by a coil through which a current of given waveform is flowing.

The present invention may be employed to important advantage in television instruments of the type employing a single-tube deflection-current oscillator which, were it capable of operating in optimum manner, would supply a saw-tooth current of linear waveform to the horizontal and/or vertical deflecting coil or yoke. In practice, however, at least in most prior art single-tube deflection-current oscillator systems, the deflection current supplied to the deflecting coil, by way of the oscillator transformer, is exponential rather than linear, the rate of change of the current being faster at the start of the wavefront than during the later portion thereof. This is due, at least in part, to the resistance of the deflecting yoke and transformer and to the internal resistance of the oscillator tube. In many cases, the rate of change at the start of the wavefront is even faster than a single exponential would produce. In any event, unless corrective means are employed, the cathode-ray beam will be deflected at a faster rate at the start of the sweep than during the later portion thereof. In the case of the horizontal sweep, the effect is to stretch the left-hand portion of the picture to a noticeable and objectionable extent.

The prior art has employed various means, including direct-current saturation of the iron of the transformer, or the use of a saturable reactor in series with the plate circuit, to correct for the non-linearity in sweep which would otherwise obtain in a magnetic deflection system of the type in question. The present invention provides relatively simple and efficient means for achieving linearity of beam sweep. The means are different from those employed by the prior art and constitute a definite improvement thereover.

It is an object of this invention to provide improved means for modifying the flux established by a coil through which a current of given waveform is flowing.

It is another object of this invention to provide means for improving the linearity of deflection of a magnetically deflected cathode-ray beam.

It is a more specific object of this invention to provide a simple and efficient compensating circuit for improving the linearity of beam deflection in a television instrument employing a single-tube deflection-current oscillator.

These and other objects, advantages and features of the present invention, and the manner in which the objects are attained, will become clear from a consideration of the following detailed description and of the accompanying drawing wherein Figure 1 is a schematic representation of a preferred embodiment of the invention, and Figure 2 is a schematic showing of a modification which may be made to a portion of the circuit of Figure 1.

Referring now to Figure 1, there is schematically shown a cathode-ray tube 10 having a conventional deflecting coil 11 to which current is supplied to produce a magnetic field adapted to effect deflection of the cathode-ray beam 9 represented in Figure 1 by the dotted line. The current to coil 11 is intended to be linearly sawtooth in waveform, but as indicated hereinabove, the sweep or scanning portion of the current waveform is, in practice, ordinarily exponential, rather than linear, the rate of change at the start of the sweep being faster than during the remaining portion thereof. The retrace portion of the current waveform is also ordinarily non-linear, but this is of little or no consequence.

So far as the present invention is concerned, the sawtooth current to coil 11 may be supplied by any suitable means. In Figure 1, the current is supplied by a deflection-current oscillator system 16 that includes a transformer 17 having windings in the plate and grid circuits of the oscillator tube 18. The oscillator circuit 16 is entirely conventional and it should suffice to point out that the plate current rises in customary fashion from zero to a maximum value at a rate which, in practice, is usually exponential, the rate of change being faster at the start than during the later portion of the rise. Upon attaining maximum value, the current falls rapidly to zero. Such sawtooth-current oscillator systems are well known in the art and need not be described in greater detail here.

In accordance with the present invention, a corrective or compensating winding 12 is provided which is so positioned as to be operatively associated with the conventional deflecting coil 11. The winding 12 is included in a closed circuit which may, but need not, comprise additional circuit elements. In the preferred embodiment, the turns of the compensating coil 12 are located adjacent, and in alignment with, the turns of the conventional coil 11. The two coils, 11 and 12, are thus mutually coupled. The flux established by the current in coil 11 will, of course, induce a voltage in coil 12, and the current which is thereby induced in coil 12 will produce lines of flux which parallel, but are of opposite direction to, the lines of flux produced by coil 11. It will be understood that coils 11 and 12 are so positioned with respect to cathode-ray tube 10, that the lines of flux derived from both windings pass through the neck of the tube.

According to the preferred embodiment of the present invention, the corrective or compensating coil 12 is comprised of a selected number of turns of wire, foil, or other conductive material, to provide a selected amount of inductance and resistivity. The selected values should be such that the L/R time constant of the compensating circuit, which in the preferred embodiment is comprised only of coil 12, is short relative to the time constant of the primary deflection-current circuit, which in the circuit of Figure 1 comprises deflection oscillator 16 and coil 11. Preferably, the L/R time constant of the compensating circuit is shorter than the sweep period, the time duration of the sweep period being substantially shorter ordinarily than the time constant of the primary deflection-current circuit. For example, I have found that in the case of the horizontal sweep of a television receiver, which under present United States standards is 63.5 microseconds, the time constant of the compensating circuit, for best linearizing results, should be of the order of from 20 to 45 microseconds. A lesser improvement is obtained where the time constant of the compensating circuit is longer than the sweep period, provided however that the time constant of the compensating circuit is shorter, preferably substantially shorter, than that of the primary deflection-current circuit which, in the case of the horizontal deflection circuit, may be of the order of 300 microseconds.

Although not essential, the compensating circuit may, if desired, include an adjustable inductance 14 and an adjustable resistance 15 in series with coil 12. In such case, the values of inductance 14 and resistance 15 will be so selected and so adjusted that the entire compensating circuit, comprising coil 12, inductance 14 and resistance 15, has a time constant which is short with respect to that of the primary deflection-current circuit, and preferably short with respect to the sweep period. Ordinarily, in practical television applications, the compensating circuit will not be required to contain adjustable elements, for the reason that the L and R values required of the compensating circuit are determined by the circuit constants of deflection-current oscillator 16 and deflecting coil 11, and these circuit constants are fixed, insofar as a particular television receiver circuit is concerned. Consequently, in practice, the compensating circuit will ordinarily be comprised merely of coil 12 which will be of such dimensions as to provide the required L and R values, without the employment of additional elements, either fixed or adjustable.

The manner in which the circuit of Figure 1 accomplishes substantial improvement in the linearity of beam deflection will now be described.

The wavefront of the generally sawtooth-current supplied by the deflection-current oscillator system 16 is, in many cases at least, exponential rather than linear, with the result that the beam is deflected at a faster rate at the beginning of the sweep than during the remaining portion thereof. The effect, in the case of the horizontal sweep of a television receiver, is to give the reconstituted picture a stretched appearance along the left side.

When the circuit of the present invention is employed, the secondary or compensating flux established by current passing through compensating coil 12 combines with the primary flux established by the current passing through the primary deflection coil 11 to produce a resultant flux. By employing a compensating flux of suitable rate of change and magnitude, the primary flux may be so modified as to produce a resultant flux having a substantially constant rate of change. In other words, the excessively high rate of sweep occurring at the beginning of the scanning lines in a television receiver, caused by an undesirably fast rate of change of flux, may be reduced by employing an opposing flux whose rate of change is faster at substantially the same time that the primary change of flux is faster.

The rate of change of the opposing or corrective flux established by the compensating coil 12 of Figure 1 is a function, among other things, of the L/R time constant of the compensating coil or circuit. I have found, where the rate of change of primary flux is fast at the start and then decreases, that by employing a compensating circuit whose L/R time constant is short with respect to that of the primary circuit, the rate of change of the combined or resultant flux may be made appreciably more constant than that of the primary flux. And I have found that if, in a television receiver, the L/R time constant of the compensating circuit be short with respect to the horizontal sweep period, as for example, a time constant of the order of from one-third to three-fourths of the sweep period, the rate of change of the resultant flux will be substantially constant throughout the complete horizontal sweep. This is in contrast to the exponential rate of change of flux which occurs in the absence of the compensating circuit. It is believed that during the retrace, when the primary flux is changing at a very rapid rate and the voltage induced across the compensating coil 12 is relatively high, a considerable amount of energy is stored in the magnetic field of the compensating coil which is released, at the end of the retrace period, at a rate determined by the time constant of the compensating circuit. Consequently, if the time constant of the compensating circuit be short, with respect to the horizontal sweep period, the opposition to the change in primary flux will be relatively greater during the early portion of the forward sweep than during the later portion.

In a typical case, the horizontal sweep may, in the absence of compensation, be from fifteen to twenty-five per cent faster at the start than at the end of the sweep. In one of my experiments, to correct such a condition, I employed a compensating coil 12 comprised of a total of four turns wound like a conventional deflecting yoke with two turns on each side of the neck of the cathode-ray tube 10. The compensating coil was positioned physically adjacent and in alignment with the turns of the horizontal deflecting coil 11. The time constant of the compensating circuit was twenty micro-seconds, which is approximately one-third of a scanning-line period. The horizontal sweep, thus compensated, was substantially linear.

Referring now to Figure 2, there is shown an alternate arrangement for effecting compensation. The circuit of Figure 2 may be connected into the circuit of Figure 1 at the points *a*, *b*, to replace that portion of the circuit of Figure 1 above these points. The arrangement shown in Figure 2 will be recognized as substantially the equivalent of the deflecting coil and compensating circuit arrangement shown in Figure 1 and described above. The operation of the alternate arrangement will be readily understood and additional description is not believed to be necessary.

Where the current in the compensating coil is produced by magnetic coupling to the primary coil, as is the case in Figure 1, and where both coils are equally efficient in producing flux across the neck of the cathode-ray tube, mathematical calculations indicate that the coefficient of coupling between the primary and compensating coils should be of the same order of magnitude as the ratio of the compensating circuit time constant to the primary circuit time constant.

It will be seen that I have provided means for substantially improving the linearity of beam sweep in a magnetic deflection system where, in the absence of correction, the sweep is exponential rather than linear. The means provided by the invention are simple and practical. The power consumed by the improved circuit is slightly greater than that consumed by the non-linear prior art circuit, but this increase is, in practice, negligible.

Having described my invention, I claim:

1. In a television apparatus having a primary circuit including a magnetic deflecting coil and means for passing a current of sawtooth waveform through said coil to establish a deflection flux, said sawtooth waveform having a scanning slope and a retrace slope, said scanning slope being non-linear, being undesirably steeper at the start than during the remaining portion thereof, the improvement which comprises the provision of a low-impedance inductive loop having a time constant substantially shorter than the time constant of said primary circuit, said loop being so coupled to said deflecting coil that a current of non-linear sawtooth waveform and substantial magnitude is caused to flow through said loop and the flux established by said loop current is parallel to and combines with the flux established by said deflecting-coil current to produce a resultant deflection flux whose rate of change is of substantially improved linearity.

2. The combination claimed in claim 1 characterized by the fact that the time constant of said loop is substantially shorter than the time duration of said scanning slope of said sawtooth-current waveform.

3. In a television apparatus having a deflection circuit comprising a magnetic deflecting coil and means for passing a current of sawtooth waveform through said coil to establish a deflection flux, said sawtooth waveform having a scanning slope and a retrace slope, the slope of said scanning portion being non-linear, being steeper at the start, the improvement which comprises the provision of a closed, low-impedance, conductive, inductive winding having an inductance/resistance time constant substantially shorter than the time duration of said scanning slope of said sawtooth waveform, said winding being so coupled to said deflecting coil that a current of substantial magnitude is induced in said winding and said winding current establishes a flux which is parallel to, combines with, opposes, and so modifies the flux established by the current in said deflecting coil that the resultant flux has a rate of change which is substantially linear throughout the scanning portion.

4. In a television apparatus having a magnetic deflecting coil and means for passing a current of sawtooth waveform through said coil to establish a deflection flux, said sawtooth waveform having a scanning portion and a retrace portion, the slope of said scanning portion being non-linear, being steeper at the start, the improvement which comprises the provision of a short-circuited compensating winding mutually coupled to said deflecting coil whereby said deflection flux induces a current of substantial magnitude in said winding, said winding comprising a preselected small number of turns positioned adjacent and in alignment with the turns of said deflecting coil, said winding having an inductance/resistance time constant substantially shorter than the time duration of said scanning portion of said sawtooth waveform, the flux produced by the current in said winding combining with and modifying the flux established by the sawtooth current in said deflecting coil to produce a resultant flux whose rate of change is substantially linear throughout the scanning portion.

5. The combination claimed in claim 4 characterized in that the inductance/resistance time constant of said winding is of the order of one-third the time duration of the scanning portion of said sawtooth waveform.

ANDREW PEERS MONTGOMERY.

REFERENCES CITED

The following references are of record in the file of this patent:

UNITED STATES PATENTS

| Number | Name | Date |
|---|---|---|
| Re. 21,400 | Blumlein | Mar. 19, 1940 |
| 1,981,322 | Nakajima et al. | Nov. 22, 1934 |
| 2,007,380 | Morlock | July 9, 1935 |
| 2,077,574 | Maloff | Apr. 20, 1937 |
| 2,220,303 | Tingley | Nov. 5, 1940 |
| 2,459,278 | Haantjes | Jan. 18, 1949 |
| 2,482,150 | Bocciarelli | Sept. 20, 1949 |